May 2, 1933.  H. R. HOLMES  1,906,601
AUTOMOBILE
Filed Sept. 6, 1932   2 Sheets-Sheet 1
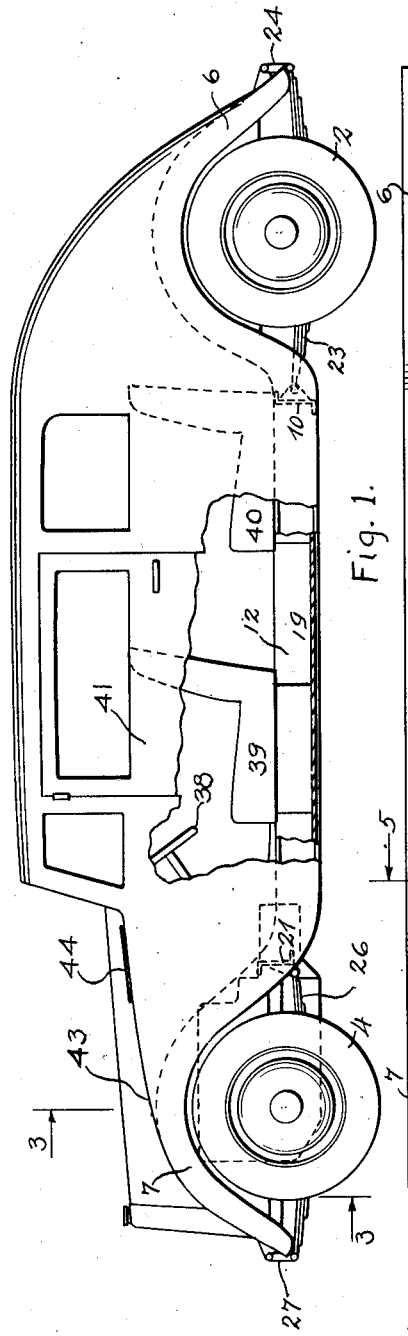
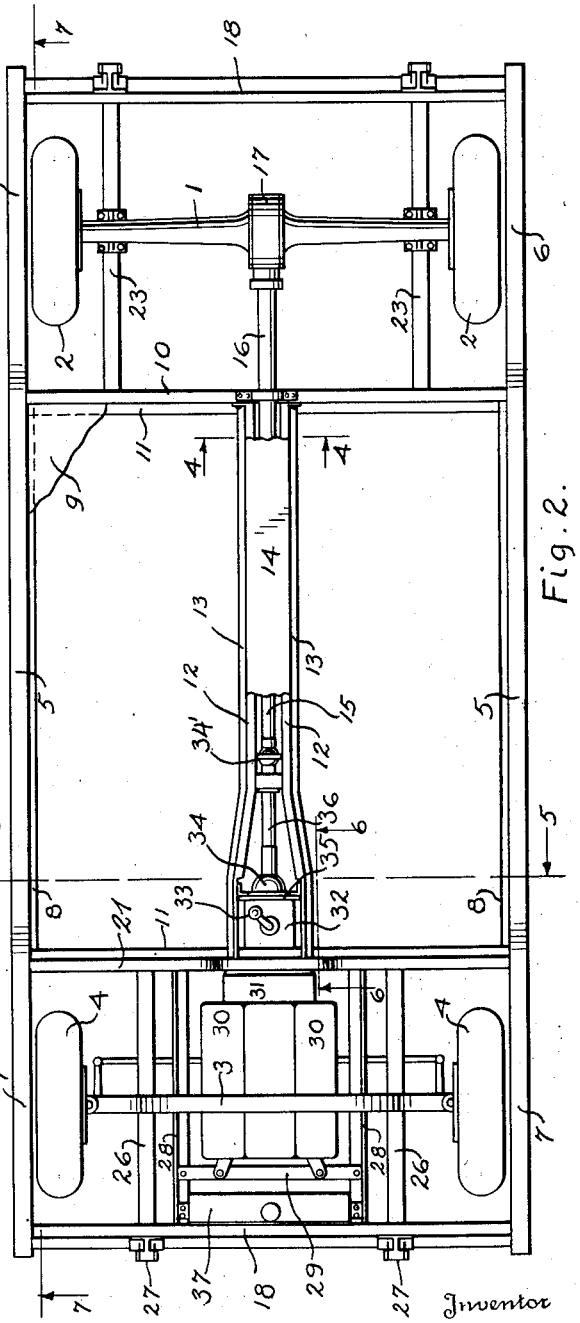
Inventor
Harleigh R. Holmes
By *A. J. O'Brien*
Attorney May 2, 1933.  H. R. HOLMES  1,906,601

AUTOMOBILE

Filed Sept. 6, 1932  2 Sheets-Sheet 2

Inventor
Harleigh R Holmes
By
Attorney

Patented May 2, 1933

1,906,601

UNITED STATES PATENT OFFICE

HARLEIGH R. HOLMES, OF LITTLETON, COLORADO

AUTOMOBILE

Application filed September 6, 1932. Serial No. 631,768.

This invention relates to improvements in automobiles and has reference more particularly to an improved frame or chassis frame construction and a new suspension for the engine.

It has long been the object of different designers of automobiles to produce a design that shall have a pleasing appearance and at the same time offer as little resistance as possible to movement through the air and different streamline effects have been tried for this purpose. In the usual automobile design, the streamline effect is obtained only on the sides and top, and the bottom of the body is provided with all kinds of obstructions that interfere with the free flow of air.

It is one object of this invention to produce a design for automobiles in which there will be a flat, smooth surface underneath the bottom of the body so as to get the streamline effect at the bottom as well as at the top.

Another object of this invention is to produce a chassis frame that shall be so constructed that it forms part of the body so as to obviate the necessity of a separate chassis frame and body.

Another object of this invention is to produce a construction in which the engine shall be located underneath the front axle which, for this purpose, is upwardly bowed, the object of this being to permit the engine to be extended forwardly of the front axle so as to get a roomier body with the same wheel base and also to permit the engine to be more easily removed and replaced than with the usual construction in which the engine is located to the rear of the front axle.

Another object of this invention is to get a broad body that will make the automobile roomier and better suited for traveling as the width can be so great that an ordinary person can lie transversely of the car and the body is therefore especially well adapted for camping, as it can be easily converted into sleeping quarters.

The above and other objects that may become apparent as this description proceeds are attained by means of a construction and an arrangement of parts that will now be described in detail, and for this purpose, reference will be had to the accompanying drawings in which the preferred embodiment of the invention has been illustrated, and in which:

Fig. 1 is a side view of the improved automobile, a portion of the body being broken away to better show the construction;

Fig. 2 is a plan view of the combined chassis and body frame showing the relationship of the different members and their position with respect to the wheels and axles;

Figure 3:
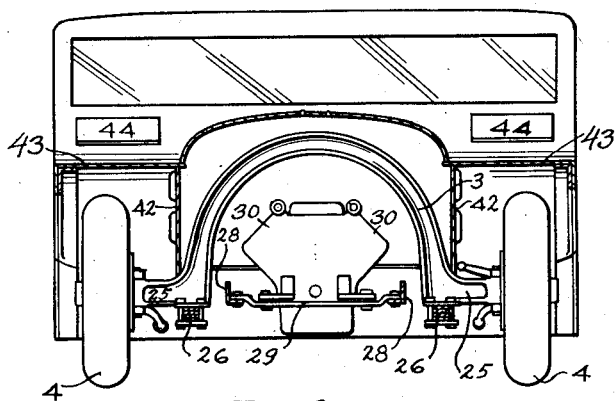
Fig. 3 is a section taken on line 3—3, Fig. 1, and shows the shape of the front axle and the position of the engine with respect thereto.
Figure 4:
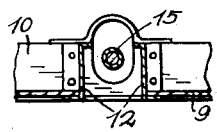
Fig. 4 is a section taken on line 4—4, Fig. 2, and shows the housing for the drive shaft.

In the drawings reference numeral 1 designates the rear axle to which the drive wheels 2 are secured and reference numeral 3 designates the front axle to the ends of which the steering wheels 4 are secured. The steering gear presents nothing novel and has therefore been shown more or less diagrammatically and will not be described in detail.

Figure 5:
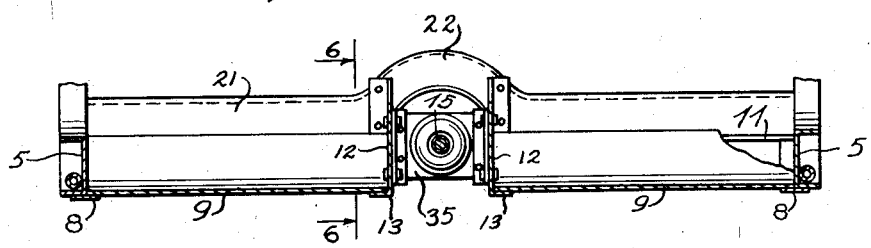
Fig. 5 is a section taken on line 5—5, Fig. 2, and shows the manner in which the rear end of the engine is supported.
Figure 6:
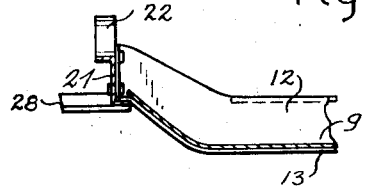
Fig. 6 is a section taken on line 6—6, Fig. 5, and shows the front end of the body floor, as well as the transverse section of the frame member that supports the rear of the engine.
Figure 7:
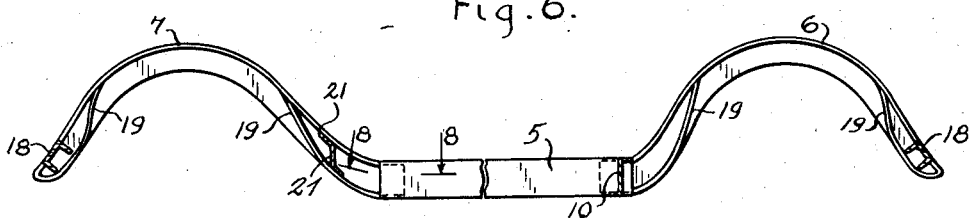
Fig. 7 is a section taken on line 7—7, Fig. 2, and shows one of the side members of the frame.
Figure 8:
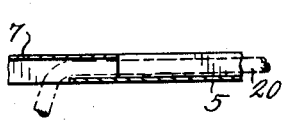
Fig. 8 is a section taken on line 8—8, Fig. 7, and shows how the exhaust pipe can be passed through an opening in the frame so as to get the pipe on the outside of the chassis frame.

The frame that takes the place of the ordinary chassis frame consists of two side members, each of which has a straight center portion 5 and upwardly convex end portions 6 and 7. The two end portions 6 and 7 are substantially identical except in size, but they have been designated by different numerals so as to distinguish between the front and the rear; in the drawings the convex portion indicated by reference numeral 6 lies above the rear wheel, while that indicated by reference numeral 7 lies above the front wheel. The straight portions 5 are formed from steel channels as shown most clearly in Fig. 5, and secured to the lower flange are narrow plates 8 that project inwardly and serve as supports for the floor plates which have been indicated by reference numeral 9. At both ends of the straight portions 5 are transverse frame members 10 and 21 which are preferably of Z-shaped cross section as shown most clearly in Fig. 7. The lower flanges of the transverse frame members, which have been designated by reference numeral 11, serve to support the floor plates 9. Extending longitudinally of the frame, half ways between members 5, are two frame members that have been designated by reference numeral 12, and which are of Z-shaped cross section. The upper flanges extend inwardly while the lower flanges, which have been designated by reference numeral 13, extend outwardly. A plate 14 is secured to the upper flanges so as to form a cover and the space between the frame members 12 forms a compartment for the drive shaft 15. This drive shaft may extend through a torque tube 16, which is connected to the differential housing 17. The free ends of the curved end members 6 and 7 are connected by means of transverse bars 18. These transverse bars are preferably steel channels like those shown in Fig. 7. Members 6 and 7 are formed from channel shaped steel bars and the lower flanges have been removed for a portion of the distance and have extensions 19 that connect with the upper flanges in the manner shown in Fig. 7. The reason for removing the lower flange is to provide more room for the wheels. It will be seen from Fig. 5 of the drawings that the frame members 5 have their flanges extending outwardly and from Figs. 7 and 8 it will be seen that the end portions 6 and 7 have their flanges extending inwardly. Where the end members 6 and 7 are connected to the straight portions 5, they are welded together so as to form a unitary assembly. By reversing the flanges in the manner explained, there will be openings at the points where the curved end members are connected with the straight member, and through this opening the exhaust pipe, which has been designated by reference numeral 20 in Fig. 8, may pass and it is also possible to use this opening for electric wires or for pipes and tubes for any purpose.

Extending transversely of the frame near the rear end of the curved member 7 is the frame member 21 of a Z-cross section. The center portion of this frame member is curved upwardly as indicated at 22 in Fig. 5.

The rear axle is connected to the frame by means of springs 23 that have been shown as located underneath the rear axle and which have their front ends secured to the transverse frame member 10, and the rear ends secured to the transverse frame member 18 by means of shackles 24. The front axle has its center portion bent upwardly in the manner shown most clearly in Fig. 3 from which it will be seen that this axle is substantially U-shaped with the base disposed upwardly and has outwardly extending axle stubs 25 at each end to which the front wheels are secured in the usual way. The front axle is secured to the frame by means of springs 26 that have been shown as connected to the inner side of the axle and whose rear ends are connected to the transverse frame member 21 in the manner shown in Figs. 1 and 2. The front ends of springs 26 are connected by means of shackles 27 to suitable brackets carried by the front transverse member 18.

Extending longitudinally of the frame member are two angle irons 28. The rear ends of these angles are connected to the transverse member 21 and the front ends to the transverse frame member 18. A transverse bar 29 connects the two members 28 and this bar serves to support the front end of the engine. In the drawings, a V-type engine has been shown and the upper ends of the two cylinder blocks have been designated by reference numeral 30. The engine is provided with a housing 31 for the clutch and a transmission casing 32. The gear shift lever has been designated by reference numeral 33, while reference numeral 34 indicates the housing for the universal joint. At a point directly back of the transmission housing, a circular bearing is provided and this is supported in an opening in the transverse supporting member 35. A short shaft 36 extends from the universal housing 34 to a second universal 34' located at the front end of the shaft 15. The radiator has been designated by reference numeral 37 and is also supported by the bars 28. It will be seen from Fig. 2 that the engine is located underneath the axle and projects to the front of the axle and that the radiator is located to the front of the engine. By supporting the engine underneath the front axle, several advantages are gained, both as to the facility with which the engine can be put into place and removed, and also because the engine can extend to the front of the axle and thus make it possible to get more room in the body of the car without lengthening the wheel base. The car is provided with the conventional steering wheel 38 and has been shown as having a front seat 39 and a rear seat 40. The front seat can be adjusted longitudinally in the usual way.

Referring now more particularly to Figs. 1 and 3 it will be seen that the floor 9 is very low compared to that of an ordinary automobile and since the door opening has its bottom on the level of the upper flange of the side members, the use of the running board can be dispensed with as it is possible to step right into the car from the ground or from the sidewalk and by this construction, the width of the body can be increased to the extent of the width of the usual running boards without producing an automobile that takes up more room on the road than the ordinary type of automobile. In the drawings the body has been shown as provided with one door on each side and these doors have been designated by reference numeral 41. By having the door wide enough access can be had to either the front or the rear seat through each of the doors. The space in which the upper portion of each front wheel is located is separated from the space in which the engine is located by a partition 42, which has a plurality of louvers. The upper walls of the fenders over the front wheels have been designated by reference numeral 43 and from Fig. 1 it will be seen that these extend upwardly on a gradual slant until they reach the windshield frame. This gives a streamline surface that tends to throw the air upwardly against the rearwardly inclined windshield frame. On each side of the engine hood is a cover 44 and underneath these covers are compartments. One of these compartments may be utilized as a tool box and the other as a compartment for the battery. At the rear of the rear seat there is considerable space which has not been shown in the drawings, but which can be used for storing spare tires and for baggage and for other purposes and therefore the automobile will not be encumbered on the outside with tire carriers which, in addition to giving an unsightly appearance, also produces considerable resistance to motion through the air.

From Fig. 3 it will be seen that the automobile body is considerably wider than that of the usual automobile and is ordinarily of a width corresponding to the extreme width of the ordinary automobile. In Fig. 3 the width of the frame and the body has been shown somewhat greater than the distance between the outer surfaces of the wheels but can be narrowed, if desired, so as not to be wider than the outside dimensions of the wheel surfaces and therefore when so designed the car will take up no more room on the road than the ordinary automobile.

Particular attention is called to the construction of the frame which, as will be seen from the drawings, has a central rectangular portion formed by the two side members 5 and the transverse members 10 and 21. Each side member has an upwardly convex extension that forms a support for the fender plates and also serves to support the transverse end members 18 that in turn support the springs.

Particular attention is called to the upwardly bowed front axle which makes it possible to locate the engine underneath the same and to extend the engine to the front of the axle. This construction, as has already been stated, makes it possible to get more room in the body without extending the wheel base and in addition makes it easier to remove the engine because it can be released and dropped down to the floor and the car moved rearwardly so as to uncover the engine, and this is a great convenience when repair is to be made.

Another advantage of this construction is that the engine can be suspended as low as desired and this decreases the angle that the drive shaft makes with the horizontal and in turn decreases the wear on the universal joints.

By having the under surface of the body substantially flat, it offers less resistance to motion through the air and thence in turn helps to increase the efficiency.

From the above description it will be seen that the automobile that forms the subject of this invention has a comparatively low body and has the floor closer to the ground than the usual automobile and that without any appreciable increase in material or labor, a much roomier body is obtained than with the usual construction. The low center of gravity obtained by this design makes the car safer for high speeds and makes it less liable to overturn than when a higher construction is employed. By combining the chassis frame with the body, a more rigid construction is obtained than when the body is formed separately and bolted to the chassis frame and besides by means of this construction the objectionable noises that usually develop due to movement between the body and the frame are obviated.

Having described the invention what is claimed as new is:

1. In an automobile having a front axle and a rear axle, each provided with wheels, means for interconnecting the axles comprising a frame having substantially parallel side members which are spaced apart so that the distance between the outside surfaces is substantially the same as the corresponding distance between the surfaces of the wheels, each frame side member having a straight central portion and upwardly convex end portions that extend over the tops of the wheels, transverse frame members connecting corresponding ends of the straight portions and forming with them a rectangle, transverse frame members between the corresponding free ends of the side frame members, springs carried by the axles, and means for making connection between the ends of the springs and the frame whereby the frame and the axles are interconnected to form a chassis assembly.

2. A chassis frame for an automobile and which forms a part of the body structure, said frame comprising two side frame members, each having a straight central portion and upwardly convex ends, transverse frame members connecting the ends of the straight portions and forming with them a rectangle, the four frame members forming the rectangle having inwardly extending flanges that form supports for a floor and other transverse frame members connecting the ends of the upwardly convex end portions.

3. A chassis frame comprising two parallel side members, each of which is formed in part from a substantially straight central portion of channel cross section with their flanges extending outwardly, transverse frame members joining the ends of the straight portions, each straight central portion having an upwardly convex portion at each end, the convex end portions being each formed from a steel bar of channel cross section, the flanges of the convex end portions extending inwardly, the end portions being connected with the ends of the straight sides so that an opening will be provided between the central portion and the end portions at their meeting ends whereby passageways for exhaust pipes and the like are provided, and transverse frame members connecting the ends of the upwardly convex end members.

4. A chassis frame comprising a rectangular frame formed from four straight frame members, each member having an inwardly extending bracket for supporting a floor, two of the parallel sides having extensions that are upwardly convex, one pair of convex extensions serving to form fender supports for the front wheels and the other pair of convex extensions serving as supports for fenders for the rear wheels, there being a transverse frame member at the free ends of each pair of upwardly convex fender supports.

5. An automobile chassis comprising, a front axle and a rear axle, a wheel secured to each end of each axle, a rectangular chassis frame whose transverse dimension is substantially the same as the distance between the outside surfaces of the wheels, the front axle having an upwardly convex U-shaped central portion, the ends of the U-shaped axle having means for attaching steering wheels thereto, a spring secured to each end of the axle between the wheel attaching means and the sides of the bent portion, the frame having two transverse bars, means for attaching the springs to the bars, an engine located underneath the curved portion of the front axle, and means for attaching the front and the rear ends of the engine to the chassis frame.

6. In an automobile chassis, a front axle having wheels at its ends, a chassis frame, the frame having a transverse bar in front of the front axle and a similar tranverse bar at the rear of the front axle, the front axle being U-shaped with the closed end at the top, springs secured to the axle between the wheels and the sides of the U, the free ends of the springs being attached to the frame, an engine having means at its front end for attaching it to the transverse bar in front of the front axle, and means for supporting the rear end of the engine from the frame, the engine lying under the front axle and in the space between the sides of the U-bend.

7. An automobile comprising, in combination, a front axle having a wheel at each end, the axle having its center bowed upwardly, a spring on each side of the bowed portion, a chassis frame supported by the springs, an engine located underneath the front axle, and means for attaching the front and the rear ends of the engine to the frame.

8. An automobile having a front and a rear axle provided at each end with a supporting wheel, a chassis frame, supporting springs interposed between the axles and the frame, an engine carried by the frame and located underneath the front axle which has its center bowed upwardly, and a power transmission shaft connecting the engine with the rear axle, the chassis frame having a central depressed portion provided with a floor, the floor being lower than the power transmission shaft, and a housing for the shaft.

In testimony whereof I affix my signature.
HARLEIGH R. HOLMES.